July 3, 1956
A. L. LUCAS
2,752,846
CAMP GRILL
Filed Nov. 25, 1953
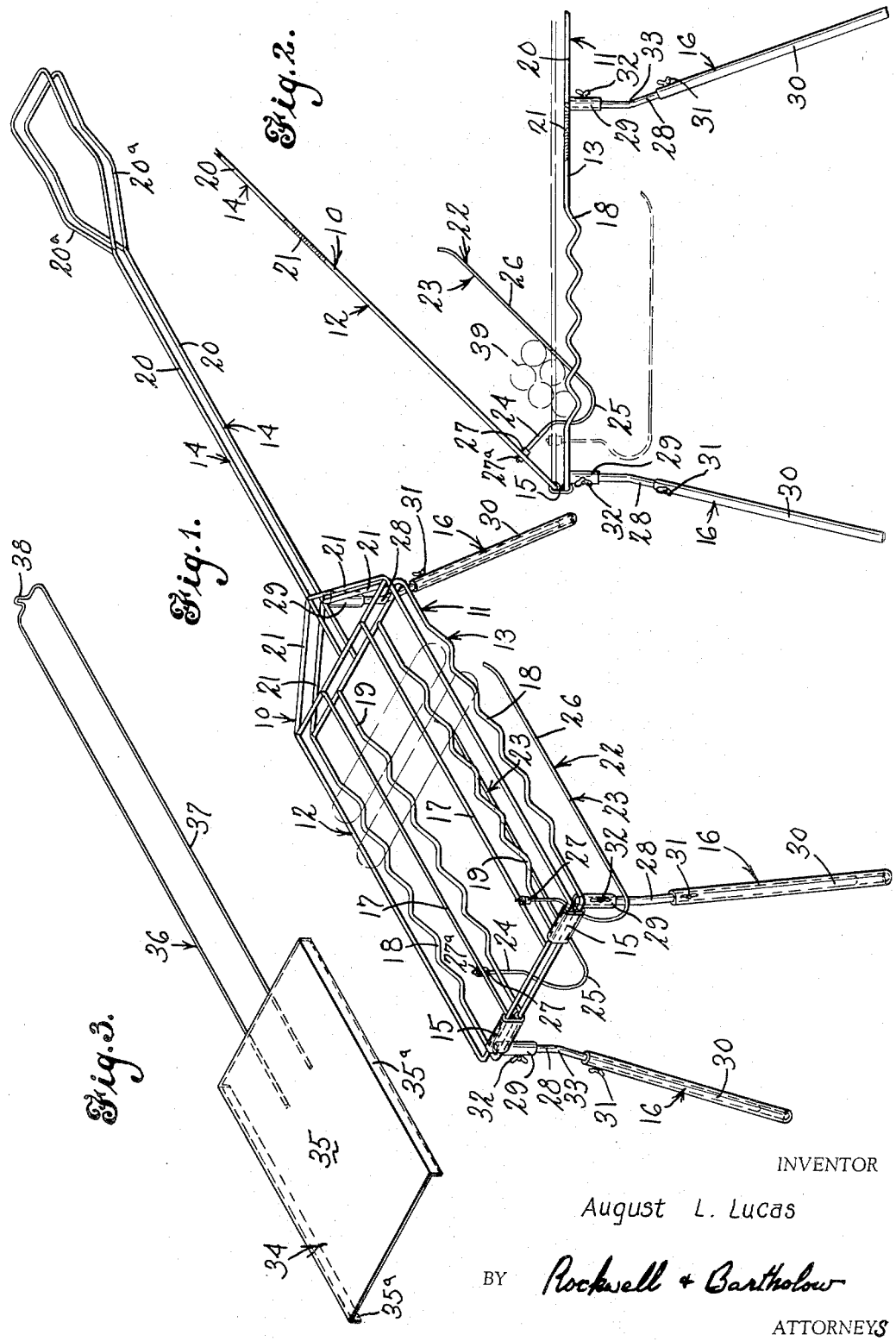
INVENTOR
August L. Lucas
BY Rockwell + Bartholow
ATTORNEYS United States Patent Office 2,752,846
Patented July 3, 1956

2,752,846

CAMP GRILL

August L. Lucas, West Haven, Conn.

Application November 25, 1953, Serial No. 394,308

2 Claims. (Cl. 99—441)

This invention relates to camp grills and relates more particularly to grills of the type employed for cooking frankfurts, steaks, and other food articles and comprising upper and lower grill members hinged to one another and each provided with an elongated handle portion.

One object of the invention is to provide a camp grill of new and improved construction.

Another object of the invention is to provide a camp grill having means to lift or strip articles of food from the lower grill member.

Further objects of the invention will be apparent from the following detailed description of the preferred form of the invention.

In the drawing:

Fig. 1 is a perspective view of a camp grill embodying the invention;

Fig. 2 is an elevational view of the grill illustrated in Fig. 1; and

Fig. 3 is a perspective view of a grid member for use with the grill illustrated in Figs. 1 and 2.

To illustrate the preferred embodiment of my invention, I have shown an upper grill member generally indicated at 10, and a lower grill member 11 of substantially the same size as the member 10. As illustrated in Fig. 1, each of the grill members may comprise an oblong frame and a longitudinally extending handle portion at the rear end of the frame. The upper frame is indicated at 12 and the lower frame is indicated at 13. The handle portions of the grill members are of substantially the same size and shape and are indicated at 14. The frames 12 and 13 are hingedly interconnected at their front ends as by a pair of straps 15. The grill members 10 and 11 are preferably formed of heavy wire, and the lower grill member 11 is provided with legs 16 to support the lower member 11 over a fire.

The frame 12 of the upper grill member comprises wires 17 in laterally spaced apart relationship and extending between the ends of the frame 12 intermediate the side portions of the frame, two wires 17 being shown. The wires 17 may be secured to the end portions of the frame 12 as by welding. The frame 13 of the lower grill member has corrugated side portions 18 and also includes corrugated wires 19 in laterally spaced apart relationship and extending between the end portions of the frame 13 intermediate the corrugated side portions 18, two wires 19 being shown. The wires 19 may be secured to the end portions of the frame 13 as by welding. Each handle portion 14 comprises a wire 20 forming a loop 20ᵃ at the rear extremity of the handle portion and extending forwardly to the rear end portion of one of the frames, as illustrated in Fig. 1. Each wire 20 is secured to one of the frames as by welding. Additional support for each wire 20 is provided in the form of two wires 21, each having one end thereof secured to the wire 20 and having the other end thereof secured to the rear portion of one of the frames, each supporting wire 21 being angularly disposed relatively to the respective wires 20 and the respective frames, as illustrated in Fig. 1.

A lifter or stripper, indicated generally at 22, is associated with the upper frame 12. In the form illustrated in the drawing, the stripper 22 comprises a pair of laterally spaced apart wires 23, each wire 23 having a substantially straight portion 24 depending from the frame 12. Each wire 23 has an arcuately formed portion 25 below and adjoining the portion 24. Adjoining the portion 25, each wire 23 has a rearwardly extending portion 26 of a length approximately half that of the frame 12. Each portion 26 is substantially straight throughout the greater part of the length thereof and has a free end which is upwardly inclined, as best shown in Fig. 2. As shown in Fig. 1, two socket parts 27 receive the upper ends of the respective wires 23, each socket part 27 being disposed intermediate the ends of one of the wires 17 and being secured thereto as by welding. Each wire 23 is mounted by a nut 27ᵃ threaded on the upper end of the wire 23 and resting for support on the upper end of one of the socket parts 27, the arrangement being such that the wires 23 may be detached from the upper frame 12, if desired. However, it will be understood that other means of connection between the wires 23 and the wires 17 may be employed. Each wire 23 extends downwardly intermediate one wire 19 and the adjacent side portion 18 of the frame 13. In the inoperative position of the stripper 22 shown in broken lines in Fig. 2, the lower and rearwardly extending portion thereof is spaced a considerable distance below the frame 13.

The legs 16 of the lower grill member 11 are angularly rigid with respect thereto and are adjustable so that the lower grill member may be raised or lowered over a fire as the condition of the fire warrants. As shown in Fig. 1, three legs 16 are employed to support the lower grill member 11, each leg 16 comprising a rod member 28 having one end thereof received in a socket member 29 fixed to the grill member 11 and having the other end thereof telescoping in a sleeve member 30. Each sleeve member 30 is provided with a set screw 31 to secure one of the rod members 28 to the sleeve 30 in adjusted position. Each rod member 28 has the upper end thereof detachably secured in one of the socket members 29 by a set screw 32. Thus it will be understood that the legs 16 may be removed from the lower grill member 11. As shown in Fig. 1, two of the socket members 29 are disposed at the respective forward corners of the frame 13 and the other socket member 29 is disposed at substantially the junction of the wire 20 and the supporting wires 21 of the lower grill member 11. The socket members 29 may be secured to the lower grill member as by welding. Each of the rod members 28 is bent, as at 33, so that each leg 16, when in assembled condition, may be inclined outwardly, as shown in Fig. 1.

A grid member shown in Fig. 3 and indicated generally at 34 may be employed between the upper and lower grill members and used for cooking articles of food which might otherwise break and/or slip between the longitudinally extending wires of the frame 13. The grid member 34 is shown as comprising an oblong plate part 35 having downwardly extending flanges 35ᵃ at the sides thereof adapted to fit over the side portions 18 of the lower frame 13. The plate part 35 may be positioned on the lower frame 13 so that the forward end of the plate part 35 is disposed adjacent and rearwardly of the socket parts 27, when the upper grill member 10 is in the lowered position thereof. The grid member 34 also comprises a rearwardly projecting handle portion 36 formed of a generally U-shaped wire 37 having the distal ends of the arms thereof secured to the under side of the plate part 35 as by welding. The wire 37 is provided with an upwardly extending rounded portion 38 intermediate the arms thereof, adapted to straddle a portion of the lower wire 20 forwardly of the loop 20ᵃ to position the handle portion 36 relatively to the handle portion 14 of the lower grill member. If desired, the grid member 34 may be positioned over the upper grill member and supported thereby in a similar manner.

To place food articles on the lower grill member 11, the upper grill member 10 is first swung upwardly by the handle portion 14 from the lowered position thereof. The upper grill member 10 is swung upwardly to a position in which the free ends of the wires 23 are positioned just below the horizontal plane of the frame 13. In this position of the upper grill member 10, which position may be termed an intermediate position, the frame 13 is easily accessible. Frankfurts, for example may be placed on the frame 13, the corrugations of the frame 13 receiving and locating the frankfurts. The upper grill member 10 may then be lowered to the clamping position thereof, illustrated in Fig. 1, in which position the frame 12 of the member 10 rests on the frankfurts. When it is desired to move or remove the frankfurts, the frankfurts may be lifted or stripped from the frame 13 of the lower grill member by swinging the upper member 10 to the position thereof illustrated in full lines in Fig. 2, or beyond this position. It will be understood that upward swinging movement of the member 10 effects upward swinging movement of the wires 23 of the stripper. It will also be understood that the wires 23 may be swung upwardly to such an extent that they may pass through the lower frame 13 (see Fig. 2) to effect a stripping action on food articles disposed on the lower frame 13. In this manner, articles of food may be easily stripped from the lower frame 13. As best shown in Fig. 2, the portions 26 of the respective wires 23 are of sufficient length to strip a frankfurt from the corrugation nearest the rear end of the frame 13. The frankfurt is picked up by the upwardly inclined free ends of the wires 23 and rolled forwardly. Frankfurts, illustrated in broken lines and indicated at 39, may be collected by the stripper 22 as shown in Fig. 2.

When it is desired to cook hamburg, for example, on my improved grill, the grid member 34 is employed. Hamburg may be placed on the plate part 35 and the latter placed on the lower frame 13 when the upper grill member is in the aforementioned intermediate position thereof. The upper grill member may then be lowered so that the frame 12 thereof rests on the hamburg. When it is desired to remove the grid member 34 from between the upper and lower grill members, the upper grill is swung upwardly so that the grid member 34 may be lifted out. It will be understood that in the intermediate position of the upper member 10, articles of food on the plate part 35 are accessible when the part 35 is positioned on the lower frame 13. It may also be noted that the free ends of the wires 23 may be engaged with the under side of the plate part 35 when the upper grill member is swung upwardly, to lift the plate part 35 from the lower frame 13 and facilitate removal of the plate or grid member 34. If desired, the wires 23 may be detached from the socket parts 27 prior to employing the grid member 34 on the lower member 11.

The legs 16 of my improved grill may be removed and the grill may be manually supported over a fire, if desired. The grill may be easily lifted and carried by the handle portions 14 thereof, and in this connection, it may be noted that the grid member 34 may be stored conveniently between the upper and lower grill members. When the grid member 34 is thus stored, a portion of the wire 20 forming the handle portion of the upper grill member may abut and rest on the rounded portion 38 of the handle portion 36 of the grid member.

One of the advantages of a camp grill embodying the invention resides in the provision of a simple and effective stripper for stripping articles of food from the lower grill member. It is well known that many articles of food tend to stick to camp grills when the articles are cooked thereon. Still another advantage of the improved grill resides in the provision of supporting legs which are adjustable to raise and lower the lower grill member, the legs being angularly rigid with the last-mentioned grill member to provide an optimum support therefor, and the legs having detachable connections to the lower grill member. Furthermore, the improved grill is of simple and rugged construction and is inexpensive to produce.

While the preferred form of the invention has been illustrated in the drawing, it will be understood that various changes may be effected in details without departure from the principles of the invention and the scope of the claims.

What I claim is:

1. In a camp grill, an upper wire frame having an elongate laterally projecting handle portion, a lower wire frame having an elongate laterally projecting handle portion below the first-named handle portion, the lower frame having a plurality of wire elements extending in a direction lengthwise of the handle portion thereof, said wire elements being arranged in spaced apart and substantially parallel relation to support a food article thereacross, the upper and lower frames being hinged together at a location remote from said handle portions so that the upper frame may be swung upwardly, means depending from the lower frame to support and space the latter above a fire, and a plurality of stripper members formed of wire in substantially parallel and spaced apart relation fixed to the upper frame and extending downwardly through the lower frame in proximity to the hinged connection of the latter with the upper frame, each stripper member in the inoperative position thereof having a portion extending longitudinally and throughout a substantial part of the length of said wire elements in the direction of the lower handle portion and terminating in a free end, said stripper portions being spaced a distance below the lower frame and in substantially parallel relation thereto when the stripper members are in their inoperative positions, each stripper member having an arcuately formed bight part adjoining said portion thereof and facing away from the hinged connection of the frames to form an article-receiving-and-collecting pocket in the stripper member when the latter is swung upwardly with the upper frame, the stripper members being operative to strip the article from said wire elements of the lower frame on upward swinging movement of the upper frame.

2. A camp grill as defined in claim 1, wherein said means supporting the lower frame comprises angularly rigid telescoping legs removably connected to the lower frame.

References Cited in the file of this patent

UNITED STATES PATENTS

| | | |
|---|---|---|
| 788,415 | Messmer | Apr. 25, 1905 |
| 1,945,165 | Smith | Jan. 30, 1934 |
| 2,023,791 | Samuels | Dec. 10, 1935 |
| 2,280,131 | Rossini et al. | Apr. 21, 1942 |